Patented Jan. 5, 1932

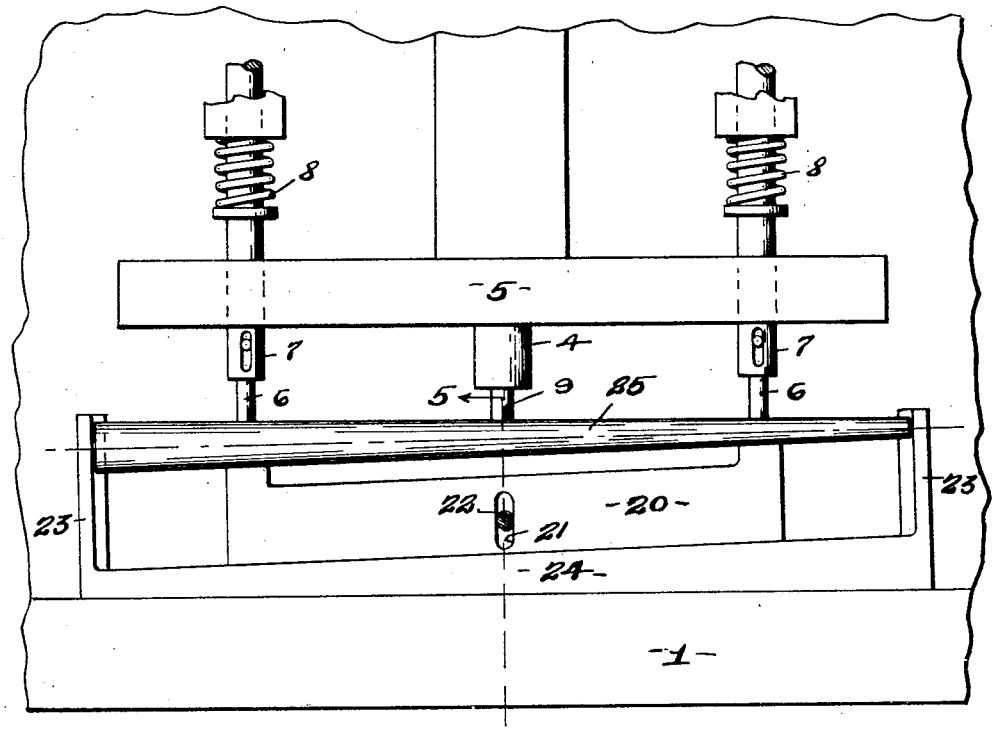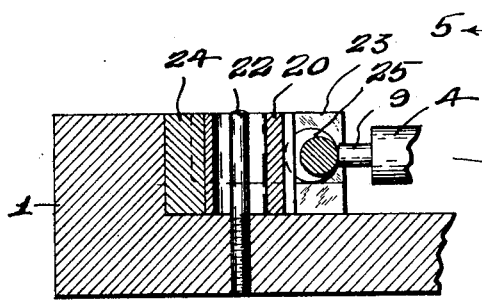

1,840,237

UNITED STATES PATENT OFFICE

HERBERT J. LEIGHTON, OF SYRACUSE, NEW YORK, ASSIGNOR TO CINCINNATI GRINDERS INC., OF CINCINNATI, OHIO, A CORPORATION OF OHIO

WORK HOLDER FOR STRAIGHTENING MACHINES

Application filed May 26, 1930. Serial No. 455,531.

This invention relates to work holders for use in machines for straightening rods, shafts and the like of the type set forth in my Patent No. 533,713 issued February 5, 1895. The invention has for its object to provide a particularly simple and efficient means for holding the work to be operated upon in such straightening machines. More particularly, a further object is to provide a means whereby rods, shafts and the like which have projections or depressions may be accurately straightened relatively to the axis of the work. Another object is to provide a means whereby tapered work may be quickly and efficiently straightened relatively to the axis of the work. These features cannot be accomplished in the machine set forth in my Patent No. 533,713. Other objects will appear throughout the specification.

The invention consists in the novel features and in the combinations and constructions hereinafter set forth and claimed.

In describing this invention reference is had to the accompanying drawings in which like characters designate corresponding parts in all the views.

Figure 4 is a plan view of a device for holding tapered work.

Figure 5 is a view taken on line 5—5, Figure 4.

Figure 1:
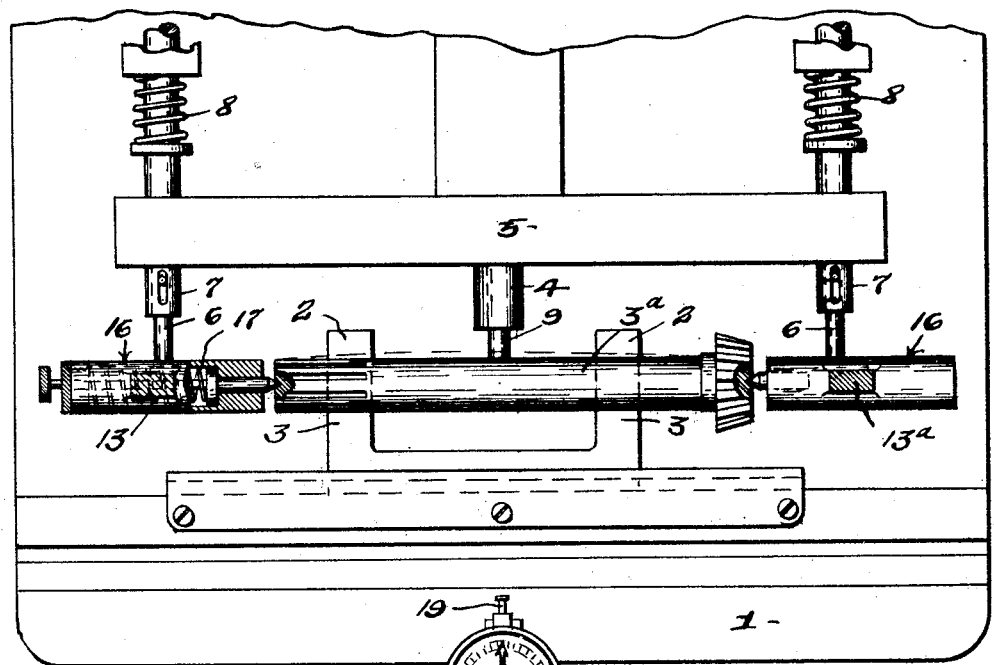
Figure 1 is a fragmentary plan view of a device embodying my invention.

In the machine set forth in my Patent No. 533,713, the work is placed upon an anvil having spaced apart supports, the piece is straightened by receiving a blow from a power driven plunger which strikes centrally of the anvil supports. In order to measure the travel of the plunger, the machine is provided with feelers, termed lateral feelers which coact against the surface of the work in proximity of the anvil supports. The ram also has a feeler slidable therein.

In operation, the bent work is placed upon the anvil supports and all three feelers brought into contact with the work. The central feeler will be displaced relatively to the lateral feelers a distance equal to the offset or bend in the work. This distance controls the travel of the ram. As the work is straightened, the feeler is displaced a lesser distance relative to the lateral feelers and finally when the work is accurately straightened, there is no displacement and there is accordingly no travel of the ram. In other words, the machine automatically straightens the work. It will be obvious that tapered work or work having projections or depressions cannot accurately be straightened in this machine, for example, the propeller shaft of an automobile which is splined at one end and has a gear on the other end. In this case, the lateral feelers will be affected if straightened with the gear or the depression of the splines.

In my present invention, I provide means whereby the lateral feelers coact with a fixed or predetermined or standard surface not provided on the work to be straightened, but on centers holding the work. In the case of the tapered work, I provide an adjustable work holder whereby the surface of the work with which the lateral and central feelers coact is always maintained in the same plane.

1 designates the base of the machine which is provided with anvils 2 and 3 on and against which the shaft 3$^a$ is placed to be straightened.

4 designates the head of a plunger or ram, and 5 a support or cross head which carries the lateral feelers 6 which are slidably mounted in suitable guides 7 carried by the cross head 5, the movement of these feelers being against the action of springs 8. That is, the feelers are yieldably carried.

9 designates the central feeler which is mounted concentric with the head of the plunger or ram. This is also yieldably mounted, all as set forth in my Patent No. 533,713. The feeler 6 corresponds to the feeler 1 and the central feeler 9 corresponds to the feeler $m$ of said patent. The cross head 5 corresponds to the cross head $j$, and the plunger with its head 4 corresponds to the plunger H of said patent.

The operation of the cross head and the feelers and of the plunger is the same as that shown in my Patent No. 533,713, and as the mechanism for effecting the relative movements of the feelers and the plunger, and for setting and actuating the plunger, forms no part of this invention, and as the same is fully described in said patent, further description is thought to be unnecessary.

Figure 3:
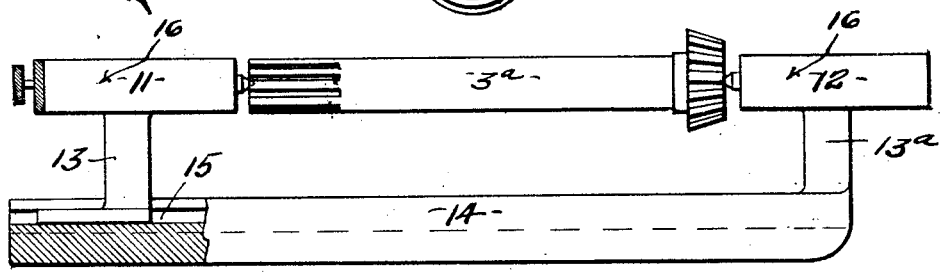
Figure 3 is an elevation of the work holder embodying centers for the work.
Figure 2:
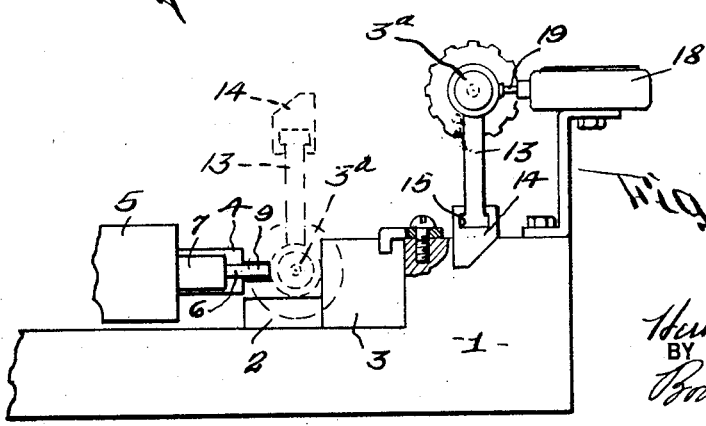
Figure 2 is a side elevation of the parts seen in Figure 1.

The novel features of this invention shown in Figures 1, 2 and 3, reside in a pair of alined centers 11, 12 carried by brackets 13, 13$^a$ supported on a carrier 14, one of these brackets as 13 being movable endwise along the carrier as at 15 for the purpose of shifting the centers to remove or place the work between the centers. Each center 11, 12 is provided with a peripheral feeler surface 16, which bears a fixed relation to the diameter of the work 3$^a$. These surfaces 16 are of the same diameter as the work 3$^a$, as the ends of the feelers 6, 9 are normally located in the same plane.

The brackets 13, 13$^a$ and the carrier 14 on which they are mounted constitute a support for the centers 11, 12. A way is formed in the base 1 of the machine, which way is complemental to the bottom formed of the carrier 14.

Any well known and suitable means may be employed to secure the bracket 13 in any fixed position to the carrier 14.

The work engaging center carried by the center 11 is slidably mounted in the center 11 and being normally placed into engagement with the work by the spring 17. Generally a great number of pieces of the same size and length are straightened consecutively. Accordingly, the bracket 13 is secured to the carrier 14 and the work 3$^a$ is easily inserted and removed from the centers by simply pressing the work towards the center 11 and removing the other end of the work from the center 12. So that the condition of the work to be operated upon may be quickly and accurately determined, the work is placed between the centers 11, 12, the carrier 14 being mounted in the groove formed in the base 1, as shown in the full line position, Figure 2.

A gage 18 is mounted upon the base 1 in such position relative to the work between the centers that the contact plunger 19 will engage the work. By simply turning the work by hand the high spot or bend in the work can readily be determined by the reading on the gage. Having determined the high spot, it is suitably marked, the carrier 14 with its associated brackets 13, centers 11, 12 and work 3$^a$, are then lifted out of the groove in the base 1 and the work turned 180° and placed on and against the anvils 2, 3. The machine is then started and as the high spot in the work is toward the feeler 9, the machine will immediately straighten the work.

In the machine shown in my Patent No. 533,713, the condition of the work is not determined before placing the same in the machine, but the work is placed in the machine, the machine started and the work revolved. It is obvious that my present invention saves much time in the straightening operation.

Very often the work intended to be straightened consists of shafts, such as propeller shafts of automobiles which are not the same diameter throughout their lengths or which do not have a solid periphery, but, for example, are splined at one end or have a gear thereon or have different sizes in diameter. It is obvious, on this class of work that the movement of the ram or plunger cannot accurately be determined by the feelers should the lateral feelers come into contact with any uneven surface or surface of different diameter. Hence, such rods cannot be straightened in the machine of Patent No. 533,713.

By providing standard peripheral feeler surfaces 16 on the centers which support the work, the amount of movement required of the plunger to straighten the work can be accurately determined. It will also be noted that with my invention, the work is always straightened relatively to the center thereof.

As a general rule, the work after having been straightened, must be ground to finish sizes. This is done in a center grinder and if the work is not straightened relatively to the center thereof, a great deal of stock must be ground away before the shaft is ground accurately relative to the center thereof and usually in such cases, the shaft will then be finished undersize.

It is to be noted in passing that the peripheral feeler surfaces 16 of the centers 11, 12 may be made any desired length relative to the length of the work to be straightened. In other words, if the length of the feeler surface 16 of each center 11, 12 is one half the length of the work, the work may be moved laterally on the anvils 2, 3 and have the surfaces 16 still provide contact with the lateral feeler 6. This feature is very important in that the work may be moved along the anvil and straightened within a very short distance of the end of the work.

In Figures 4 and 5, I have shown a preferred embodiment of another form of work holder, particularly adapted to hold tapered work. It will be obvious that tapered work cannot be straightened in a machine, as shown in my former patent or with the center type of holder just described.

Referring to Figures 4 and 5, 20 designates an anvil mounted upon the base 1 of the machine. This anvil has an elongated slot or opening 21 arranged in the center of the anvil and extending at right angle to the axis thereof. A pin 22 is fixed in the base 1 of the machine. The anvil 20 is mounted on the base 1 with the pin 22 extending through the slot 21. The pin is of approximately the diameter of the width of the slot. Accordingly, the anvil may be moved toward and from the plunger but cannot be moved laterally relative to the base 1.

23 designates work holding arms mounted upon or integral with the carrier 24. One side of the carrier 24 is tapered relative to the opposite side. The carrier is mounted in the base 1 of the machine between the anvil 20 and the upright portion of the base 1 with the tapered side in contact with the anvil. The taper of this carrier 24 is complemental with the taper of the work to be straightened.

In operation, the work is placed in the work holders 23, the machine started and through cooperation of the feelers 6, 9 the ram or plunger strikes the work on the high side as heretofore described. So that the work may be straightened throughout the different parts of its length, the carrier 24 with its associated work holders 23 and tapered work 25 is moved laterally relatively to the base of the machine in either direction. It will be noted that the anvil 20 does not move laterally. When the work is moved, say to the right, Figure 4, the anvil will be permitted to move toward the upright portion of the base 1 due to the taper of the carrier 24. Also, the work will be moved into engagement with the anvil 20 inasmuch as the taper of the work and the taper of the carrier 24 are the same. It is obvious that upon reverse movement of the work, the anvil moves out to compensate for the lesser diameter of the work. In other words, the peripheral surface of the tapered work 25 is always maintained in parallel relation to the ends of the feelers 6, 9.

What I claim is:

1. In a work holder for straightening machines, the combination with a pair of alined centers for supporting the work to be straightened, said centers having a peripheral feeler surface, a carrier for the centers, an anvil against which the work is placed, a plunger movable toward and from the work and the anvil to straighten the work, a support movable toward and from the anvil, lattral and central yieldably mounted feelers carried by the support for engaging respectively said peripheral surfaces of the centers and the periphery of the work, the movement of the central feeler relative to the lateral feelers serving to determine the amount of movement of the plunger.

2. In a work holder for straightening machines, the combination with a pair of alined centers for supporting the work to be straightened, said centers having a peripheral feeler surface, a carrier for the centers, an anvil against which the work is placed, a plunger movable toward and from the work and the anvil to straighten the work, a support movable toward and from the anvil, lateral and central yieldably mounted feelers carried by the support for engaging respectively said peripheral surfaces of the centers and the periphery of the work, the movement of the central feeler relative to the lateral feelers serving to determine the amount of movement of the plunger, the feeler surfaces of the centers being of substantially the same diameter as the work to be straightened.

3. A work holder for straightening machines having a base formed with an anvil, a plunger movable toward and from the anvil to straighten the work, means including lateral and central feelers for determining the amount of movement of the plunger, a pair of alined centers for supporting the work, the centers having peripheral feeler surfaces, a carrier for supporting the centers on the base in one position, a gage arranged to coact with the work to determine the location of the bend in the work, the support being shiftable to carry the rod into engagement with the anvil and to shift the point on the rod with which the gage coacts into the path of the plunger and the central feeler, and the centers into the path of the lateral feelers.

4. A work holder for straightening machines of the class described comprising a carrier having one side tapered relative to the other side and mounted upon the base of the machine, an anvil movably mounted upon the base of the machine and coacting with the tapered side of the carrier, means movable toward and from the anvil to straighten the work, means including lateral and central feelers for determining the amount of movement of the movable means, and work holding arms associated with the carrier for positioning the work upon the anvil whereby upon axial movement of the work, the periphery of the work is maintained in parallelism with the ends of the lateral and central feelers of the straightening machine.

5. A work holder for straightening machines of the class described having a base, an anvil for supporting the work to be straightened, a plunger movable toward and from the work for straightening the same and central and lateral feelers for determining the action of the plunger relative to the work, said work holder including a carrier having work holding arms associated therewith and means coacting between the carrier and the anvil for maintaining the periphery of the work in parallelism with the ends of the central and lateral feelers.

6. A work holder for straightening machines of the class described having a base, an anvil slidably mounted upon the base for supporting the work to be straightened, a plunger movable toward and from the work for straightening the same, central and lateral cooperating feelers for determining the travel of the plunger relative to the work to be straightened, said work holder including a carrier having a tapered surface relative to the base of the straightening machine, work holding arms associated with said carrier, the tapered surface of the carrier coacting with the anvil to maintain the periphery of the work in parallelism with the ends of the feelers when the work is moved axially, said anvil slidable in the direction of the movement of the plunger only.

In testimony whereof, I have hereunto signed my name, at Syracuse, in the county of Onondaga, and State of New York, this 22d day of May, 1930.

HERBERT J. LEIGHTON.